(12) United States Patent
Winistörfer (10) Patent No.: US 12,276,319 B2
(45) Date of Patent: Apr. 15, 2025

(54) TOGGLE

(71) Applicant: CARBO-LINK AG, Fehraltorf (CH)

(72) Inventor: Andreas Winistörfer, Fehraltorf (CH)

(73) Assignee: CARBO-LINK AG, Fehraltore (CH)

( * ) Notice: Subject to any disclaimer, the term of this patent is extended or adjusted under 35 U.S.C. 154(b) by 1073 days.

(21) Appl. No.: 17/054,028

(22) PCT Filed: Apr. 16, 2019

(86) PCT No.: PCT/EP2019/059758
§ 371 (c)(1),
(2) Date: Nov. 9, 2020

(87) PCT Pub. No.: WO2019/214911
PCT Pub. Date: Nov. 14, 2019

(65) Prior Publication Data
US 2021/0229779 A1   Jul. 29, 2021

(30) Foreign Application Priority Data

May 9, 2018   (CH) .................................... 00580/18

(51) Int. Cl.
*F16G 11/12*   (2006.01)
*B63B 21/04*   (2006.01)
*B63H 9/10*   (2006.01)

(52) U.S. Cl.
CPC .............. *F16G 11/12* (2013.01); *B63B 21/04* (2013.01); *B63H 9/10* (2013.01)

(58) Field of Classification Search
CPC ......... B63B 21/00; B63B 21/04; B63B 21/22; F16G 11/00; F16G 11/12; B66D 3/00; B66D 3/04

USPC ......................................................... 114/218
See application file for complete search history.

(56) References Cited

U.S. PATENT DOCUMENTS

| 4,255,836 A | 3/1981 | Dunahoo |
| 5,018,775 A | 5/1991 | McKenna et al. |
| 7,205,251 B2 | 4/2007 | Wellman |
| (Continued) | | |

FOREIGN PATENT DOCUMENTS

| DE | 39224379 A1 | 1/1991 |
| EP | 0 815 329 B1 | 1/2003 |

OTHER PUBLICATIONS

EPO (Riswijk, NL), English language version of the International Search Report, Form PCT/ISA/210, for International Application PCT/EP2019/059758, dated Jun. 17, 2019 (5 pages).

(Continued)

*Primary Examiner* — Lars A Olson
(74) *Attorney, Agent, or Firm* — Pauley Erickson & Swanson (57) ABSTRACT

The invention is directed to a toggle 1 for rigging of a boat or a crane, comprising a first coupling end 100 comprising a first coupling means 110 having a first axis of engagement 120 and a second coupling end 200 comprising a second coupling means 210 having a second axis of engagement 220. The first and the second coupling means 100, 200 are arranged a distance apart from each other. A closed-loop connecting means 300 is made from a fibre-reinforced plastic. The closed-loop connecting means 300 is looped about the first axis of engagement 120 and about the second axis of engagement 220, mechanically interconnecting the first coupling means 110 with the second coupling means 210.

20 Claims, 6 Drawing Sheets

(56) References Cited

U.S. PATENT DOCUMENTS

2008/0197331 A1 8/2008 Curchod
2017/0131466 A1 5/2017 Van Der Schuit

OTHER PUBLICATIONS

EPO (Riswijk, NL), Written Opinion of the International Searching Authority, Form PCT/ISA/237, for International Application PCT/EP2019/059758, dated Jun. 17, 2019 (5 pages).

TOGGLE

BACKGROUND OF THE INVENTION

Field of the Invention

The present invention is directed to a toggle e.g. for rigging of a sailboat or a crane. However, toggles according to the present invention are not limited to these applications. The present invention is further directed to a method for producing of such a toggle.

Discussion of Related Art

Various types of toggles made from stainless steel are available from different manufacturers.

EP 0815329 B1 was published on 07 Jan. 1998 on behalf of Eidgenössische Materialprüfungs—and Forschungsanstalt Empa and discloses a looping anchor or retaining element including several superposed belt layers or plies in order to anchor, reinforce, affix or keep together construction or machine parts, construction members, construction works or parts thereof, or at least to apply a force component.

U.S. Pat. No. 7,205,251 B2 was published on 17 Apr. 2007 on behalf of NVH Concepts and discloses a structural composite comprising combinations of continuous fibres in the form of loops, chopped fibres, woven fibres and foams in order to obtain parts, e.g. automotive components, that are lightweight and resistant to corrosion.

SUMMARY OF THE INVENTION

Components used for rigging of sailboats and cranes (including harbour cranes, ship cranes and offshore cranes) are typically exposed to significant altering mechanical loading as well as demanding environmental, respectively chemical and physical, conditions. This in particular holds true for toggles which are widely used in sailboats and cranes in order to ensure that cables or ropes can be pivoted about two axes in order to avoid bending moments and obtain proper tensile load cases. Such toggles are typically exposed to direct sunlight, wind and rain as well as highly corrosive substances like salt water and other chemical substances. In order to withstand these conditions toggles used for rigging of sailboats are typically made from high grade stainless steel, such as duplex or superduplex stainless steel. Toggles used for rigging of cranes may be made from machined stainless steel. However in case of large-dimension toggles necessary for cranes with extremely high load capacities, toggles for rigging of cranes may also be produced using forging techniques and corresponding steels, which typically are less resistant to environmental influences.

A major drawback of such conventional types of toggles is that for relatively large sailboats with a length overall of 50 m (metres) or more such metallic toggles used for fore-and-aft rig typically have a total weight of up to 50 kg (kilograms) and even more. Mounting of such heavy components high in the mast of sailboats (being their most common place of installation), respectively at the top of a crane, has a significant effect on the righting moment and hence rolling characteristics of a sailboat, respectively the stability and load capacity of a crane.

Furthermore, installation of such heavyweight toggles high in the mast or on top of a crane often requires a complex procedures.

In addition, even when using high grade stainless steels in many cases durability of toggles turns out to be not sufficient due to the mentioned demanding load cases and environmental conditions, which particularly holds true for forged toggles.

In order to solve at least one of the aforementioned problems, a toggle according to the present invention typically comprises a first coupling end that comprises a first coupling means defining a first axis of engagement. The toggle further comprises a second coupling end comprising a second coupling means defining a second axis of engagement. The first and the second coupling means are arranged a distance apart from each other. According to the invention a closed-loop connecting means made from a fibre-reinforced plastic is looped about the first axis of engagement and about the second axis of engagement, mechanically interconnecting the first coupling means with the second coupling means.

Within the context of the invention the closed-loop connecting means should be understood as being endless as a whole, in that when one starts at an imaginary starting point and goes along the closed-loop connection means (in longitudinal direction) one will come back to the imaginary starting point. However, as will be explained in more detail below, the fibres of the closed-loop connecting means do not have to be endless, respectively do not have to be closed-loops themselves. Hence a closed-loop connecting element may e.g. be made from multiple strips (respectively tapes) of unidirectional fibres essentially arranged in longitudinal direction of the closed-loop connecting means.

As reinforcing fibres for the fibre-reinforced plastics in particular carbon fibres may be used in order to obtain toggles that have a particularly high mechanical strength. However, for some application alternatively or in addition also other types of fibres may be used, such as glass fibres, aramid fibres, basalt fibres or combinations thereof.

A variation of a toggle suitable for particularly demanding mechanical loads can be obtained if the first and the second axes of engagement are essentially perpendicular to each other as such a variation may be used in order to attach a cable or rope to e.g. a mast, without applying any bending moments (respectively side loads) to the mechanical connection point. Therefore the first axis of engagement may constitute a first rotary joint (respectively hinge) and the second axis of engagement may constitute a second rotary joint, the joint axis of the first rotary joint being essentially perpendicular to the joint axis of the second rotary joint. For certain applications the first and the second axis of engagement may also be skewed.

Good results for certain applications may be obtained if the first and the second axes of engagement are spaced between 100 mm and 500 mm apart from each other of. However, the present invention is not limited to such dimensions and also toggles with smaller and particularly larger dimensions can be obtained using the inventive concepts described herein.

Good results may be obtained if the closed-loop connecting means is looped twice about the first axis of engagement and is looped twice about the first axis of engagement, as will be shown in more detail below. Thus a particularly efficient loading of the closed-loop connecting means can be obtained and hence the mechanical competence of the toggle can be significantly increased.

Particularly good results may be obtained if the closed-loop connecting means, if viewed in longitudinal direction starting from an imaginary starting point arranged between the first and the second axes of engagement, first loops about the first axis of engagement forming a first loop and subsequently loops about the second axis of engagement forming a second loop and subsequently loops the first axis of engagement forming a third loop and subsequently loops the second axis of engagement forming a fourth loop and subsequently goes back to the imaginary starting point. Thus, a particularly efficient load transfer between the connecting first and the second coupling means and the closed-loop connecting means, as well as efficient loading of the closed-loop connecting means can be obtained.

According to one variation of the invention, the second loop and the fourth loop may be arranged adjacent to each other, as will be shown in more detail below. Particularly good results may be obtained, if the second loop and the fourth loop are at least partially bonded by a resin material and/or an enclosure as will subsequently be explained. Thus, a combined loop may be obtained which may e.g. be mechanically advantageous for certain variations of eye-type coupling ends.

According to a variation of a toggle that has a particularly high strength, the closed-loop connecting means comprises a plurality of fibrous layers laying one above the other in a local stacking direction. Very efficient load transfer between the first coupling means and the closed-loop connecting means and/or the second coupling means and the closed-loop connecting means may be obtained if in a region of the closed-loop connecting means that loops about the first axis of engagement the plurality of fibrous layers is arranged such that the local stacking direction is essentially perpendicular to the first axis of engagement and/or in a region of the closed-loop connecting means that loops about the second axis of engagement the plurality of fibrous layers is arranged such that the local stacking direction is essentially perpendicular to the second axis of engagement.

Alternatively or in addition, in a region of the closed-loop connecting means that loops about the first axis of engagement the plurality of fibrous layers may be arranged such that the local stacking direction is essentially in parallel to the first axis of engagement and/or in a region of the closed-loop connecting means that loops about the second axis of engagement the plurality of fibrous layers may be arranged such that the local stacking direction is essentially in parallel to the second axis of engagement.

According to a variation of the invention, between the first and the second connecting means the closed-loop connecting means is twisted such that the local stacking direction of a plurality of fibrous layers rotates approximately 90° about the local longitudinal direction of the closed-loop connecting means. Thus, optimal load transfer between the closed-loop connecting means and the first and the second coupling means as well as maximum closed-loop coupling means with particularly high strength can be obtained.

Good results may be obtained if the fibrous layers are formed by at least one band which is multiply looped about itself. Thus, automated production of a mechanically highly competent closed-loop connecting means becomes possible.

According to a variation of the invention the closed-loop connecting means forms four strands that extend between the first and the second coupling means, each strand tangentially aligning to both the first and the second coupling means before looping about the first and the second axis of engagement. Thus, a particularly well-balanced load distribution within the toggle can be obtained, increasing the total mechanical competence of the toggle. In particular such a toggle is relatively insensitive to temporary misalignment of the toggle that may occur e.g. due to friction phenomena at the two coupling means. In order to increase maximum strength of such a toggle, strands may be essentially straight. Particularly high strength may be obtained if at least two strands are in parallel to each other.

For some applications the closed-loop connecting means may be surrounded by an enclosure in a region adjacent to the first and/or in a region adjacent to the second coupling means. Thus, optimal alignment of the fibres of the closed-loop connecting means in the region of load introduction may be maintained even if high loads are applied to the toggle.

In order to obtain a toggle that has a significantly increased strength, the closed-loop connecting means may comprise a plurality fibrous layers laying one above the other. Good results may be obtained if the fibrous layers are formed by at least one band which is multiply looped about itself. The two ends of the band may be connected to the directly adjacent band layer or rest loosely against the latter.

For some applications the first coupling means may comprise a first force application means and/or the second coupling means may comprise a second force application means that may at least assist in applying/transmitting loads to the toggle. The first force application means and/or the second force application means may comprise at least one hole e.g. configured to receive a bolt for establishing a bolt connection, respectively a rotary joint or hinge.

Good results may be obtained if the first and/or the second coupling means comprises a bushing arranged such that the closed-loop connecting means loops, respectively at least partially encompasses about the bushing. Mechanically particularly good results may be obtained if the bushing is a thimble. A highly durable toggle may be obtained if at least one bushing is at least partially made from a metal. Alternatively or in addition at least one bushing is at least partially made form a ceramic and/or from a plastic. For some applications, at least one bushing may also at least partially be made from a fibre reinforced plastic comprising short and/or long fibres.

According to one variation of the invention, the bushing may comprise a groove that extends at least partially in peripheral direction around the bushing and that is delimitated by a skirt configured such that at least part of the closed-loop connecting means can be arranged in the groove, as will be shown in more detail below. Thus, the closed-loop connecting means can be supported in lateral/transversal direction, preventing lateral extension and hence disintegration of the carbon-fibre reinforced plastic.

Good results may be obtained if the closed-loop connecting means when arranged in the groove partially protrudes from the groove. Protrusion may vary in circumferential direction around the bushing. Alternatively or in addition, the closed-loop connecting means may be partially flush countersunk in the groove when arranged in the groove.

In order to maintain alignment of the fibres of the closed-loop connecting means, at least part of the closed-loop connecting means may be surrounded by an enclosure. Such an enclosure may comprise a fibre-reinforced plastic. Good results may be obtained if at least part of the closed loop connecting element is wrapped with a roving made from fibres (e.g. carbon fibres).

Good results may be obtained if the closed-loop connecting means is at least partially made from layers of pre-impregnated fibres (aka pre-pregs). In particular layers of unidirectional fibres that extend in longitudinal direction of the closed-loop connecting means may be used.

For certain applications, the first coupling means and/or the second coupling means may comprise an alignment compensator means configured to rotate the corresponding axis of engagement relatively to the closed-loop connecting means. Hence misalignment of a load introduction means to be interconnected with the first or the second coupling means can be compensated to a certain extent, increasing the misalignment tolerance of the toggle.

Good results may be obtained if the alignment compensator means comprises an at least partially spherical or ellipsoidal or paraboloidal body in order to facilitate above-mentioned rotations. The fibres of the closed-loop connecting means may be aligned with the curved outer surface of such a body. For some applications an anti-friction means may be arranged between the alignment compensator means and the closed-loop connecting means. Such an anti-friction means may be at least partially made from a metal and/or a ceramic and/or a plastic (e.g. PTFE). An anti-friction means may comprise a separate component like a bushing. Alternatively or in addition, an anti-friction means may comprise a surface coating of the alignment compensator means.

For some applications the first coupling end may be a jaw-type coupling end or may be an eye-type coupling end. As well, the second coupling end may be a jaw-type coupling end or may be an eye-type coupling end. However, also other types of coupling ends may be used.

In order to facilitate production of a toggle and increase the mechanical competence of a toggle according to the invention, the toggle may comprise a supporting core arranged between the first and the second coupling means. The supporting core may support at least parts of the closed-loop connecting means in lateral direction and hence significantly increase the resistance of the toggle against buckling. Alternatively or in addition it may also be used as a jig when producing the closed-loop connecting means. For certain applications a supporting core used as a jig may also be removed after production of the closed-loop connecting means. However, according to a variation of the invention a supporting core may also be installed after production of a closed-loop connecting means. Reliable lateral support of the closed-loop connecting means as well as a resulting lightweight toggle may be obtained if the supporting core is at least partially made from a solid foam.

According to a variation of the present invention, the toggle may comprise a housing constituting an outer shell of the toggle. Such a housing may be used in order to protect the toggle against damage caused by mechanical impacts and/or chemical influences and/or physical impacts (e.g. UV radiation). Alternatively or in addition, a housing may also be applied in order to increase the mechanical competence of a toggle as will subsequently be explained.

According to a variation of the invention the housing may at least partially encompass the closed-loop connecting means in the region between the first and the second coupling end. Thus, the risk of damage due to lateral mechanical impact to the closed-loop connecting means can significantly be reduced. In order to indicate potentially critical impacts that may have occurred, impact-indicating means may be applied, such as special varnish or coatings.

Good results may be obtained if the housing is configured to withstand torque applied between the first and the second coupling end. Such torque may e.g. result from friction in Furler bearings. Therefore the housing may be mechanically interconnected with the first and the second coupling means, e.g. by a form fitting or by an adhesive connection. Good resistance against torque may be obtained if such a housing comprises an essentially tubular (closed) shape as will be explained in more detail below.

A particularly lightweight variation of a toggle according to the invention which can also withstand particularly high torques may be obtained if the housing is at least partially made from a fibre-reinforced plastic, in particular a from a carbon fibre reinforced plastic. However, alternatively or in addition also other types of fibres may be used as described herein. In particular aramid fibres may be used in order to increase impact tolerance. Good results may be obtained if the housing is at least partially made from a fabric and/or a braid (e.g. a braid hose).

A variation of a toggle that has a particularly good performance under torque can be obtained if the housing comprises a cross wrap made from reinforcing fibres, in particular if made from carbon fibres. Good results may be obtained if such a cross wrap is at least partially made by an automated wrapping assembly. Particularly high performance under torque loads may be obtained with a +45°/−45° cross wrap. However, for certain applications also a 60° cross wrap may be applied in order to obtain a housing that has a high mechanical competence and at the same time precisely defined boundary regions.

Alternatively or in addition the housing may comprise at least one layer of reinforcing fibres that are pre-aligned according to a predefined ply-layout and then wrapped around the toggle.

The present invention is also directed to providing a method for producing of a toggle as described herein. The method comprises the method steps of providing a first coupling means that has a first axis of engagement and providing a second coupling means having a second axis of engagement. In a further step the first and the second coupling means are arranged such that the first and the second axes of engagement are aligned a distance apart from each other. In a further step a thin-walled elongated band is looped about the first coupling means and subsequently about the second coupling means. In at least one further method step, latter method step is repeated to lay multiple layers of the thin-walled elongated band, in particular a band comprising reinforcing fibres, such that a closed-loop connecting means is formed, interconnecting the first and the second coupling means.

Good results may be obtained if the first and the second coupling means are arranged essentially perpendicular to each other.

A toggle with particularly high mechanical strength may be obtained if the two ends of the thin-walled elongated band are laid such that they rest directly against or under the latter.

A toggle that is particularly lightweight and has a particularly high mechanical competence may be obtained if the closed-loop connecting means comprises at least one layer of unidirectional fibres as described herein, the layers forming a fibre-reinforced plastic (preferably a thermosetting/curable plastic).

Toggles having particularly high strength may be obtained if the method comprises a further method step f), after method step e), during which a force is applied at the first and the second coupling means to induce a specified tensile stress in the closed-loop connecting means; and in a subsequent method step g) the closed-loop connecting means is consolidated. Good results may be obtained if the thin-walled elongated band comprises fibres that are pre-impregnated with a resin and if in method step g) the resin is hardened by heat in order to consolidate the closed-loop connecting means.

In a variation of the invention the closed-loop connecting means is produced at least partially from a fibre-reinforced plastic comprising a curable matrix and the method comprises a first further method step of at least partially curing the matrix and a subsequent second further method step of establishing a first and/or a second force application means at the first, respectively at the second coupling means. Thus, first and second force application means can be precisely positioned relatively to each other.

BRIEF DESCRIPTION OF SEVERAL VIEWS OF THE DRAWINGS

The herein described invention will be more fully understood from the detailed description of the given herein below and the accompanying drawings, which should not be considered as limiting to the invention described in the appended claims.

DETAILED DESCRIPTION OF THE INVENTION

Figure 1:
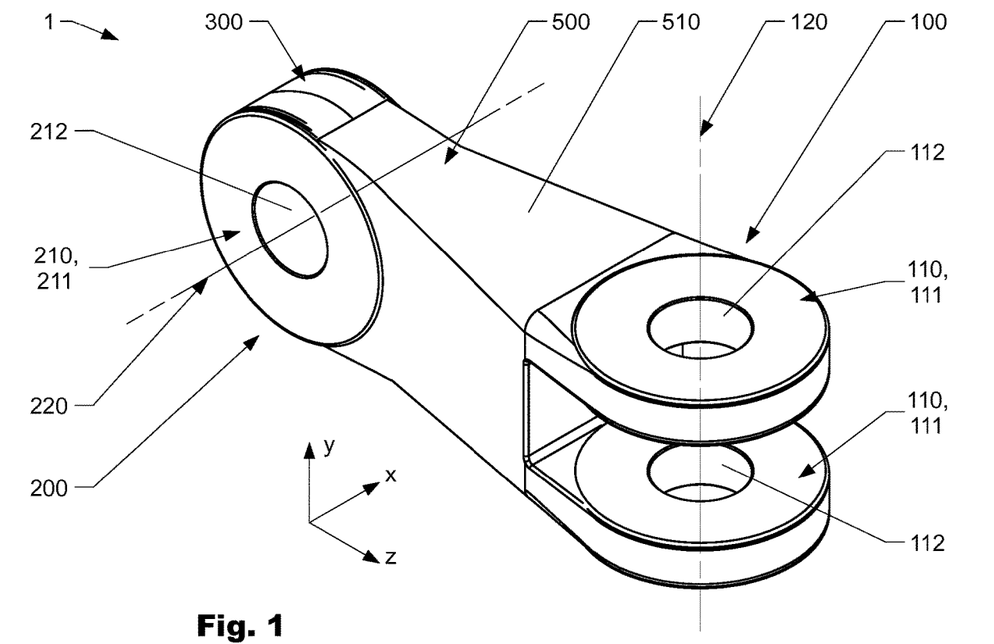
FIG. 1 schematically shows a first variation of a toggle according to the invention in a perspective view from above.
Figure 2:
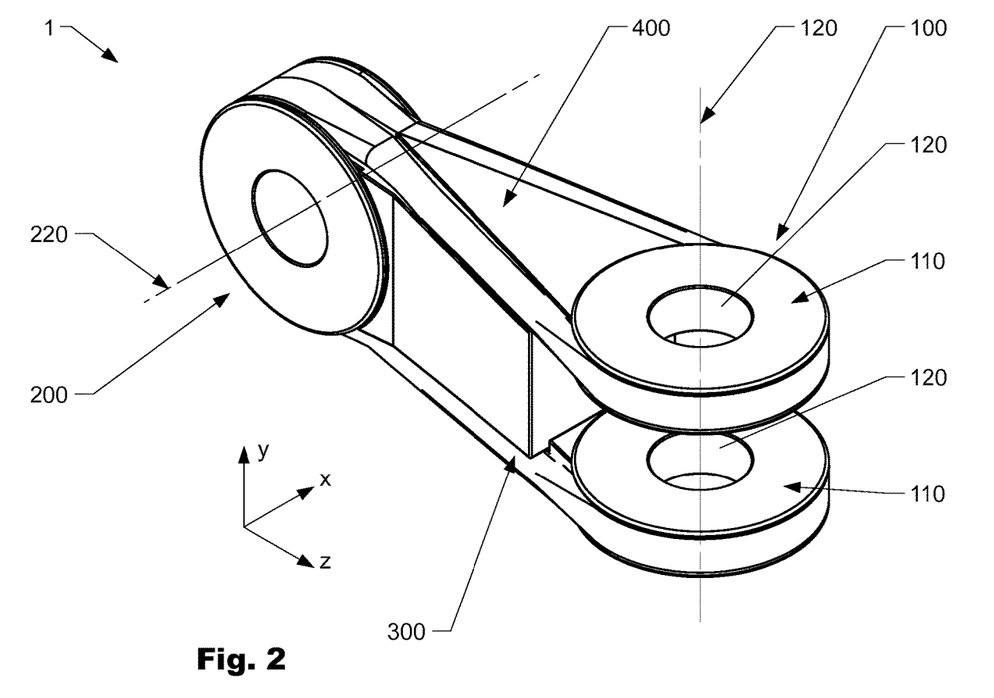
FIG. 2 schematically shows the toggle of FIG. 1, the housing being removed for illustrative purposes in a perspective view from above.

FIG. 1 depicts a first variation of a toggle 1 according to the present invention. The toggle 1 comprises a first coupling end 100 comprising a first coupling means 110 which has a first axis of engagement 120. The toggle 1 further comprises a second coupling end 200 comprising a second coupling means 210 which has a second axis of engagement 220. The first coupling end 100 is a jaw-type coupling end wherein the second coupling end 200 is an eye-type coupling end. The first coupling means 110 is embodied as a bushing 111 (respectively a pair of bushings 111) and comprises a first force application means 112 embodied as cylindrical hole that extends along the first axis of engagement 120 through the pair of bushings 111. The second coupling means 210 is also embodied as a bushing 211 and comprises a second force application means 212 embodied as cylindrical hole that extends along the second axis of engagement 220. The first and the second force application means 112, 212 are configured to receive bolts (not shown) to establish bolt connections in order to apply an external load to the toggle 1, which will typically be a tensile load in z-direction. As well, the toggle 1 comprises a closed-loop connecting means 300 that is made from a fibre-reinforced plastic and is looped about the first axis of engagement 120 as well as the second axis of engagement 220, thereby mechanically interconnecting the first coupling means 110 with the second coupling means 210, as will be shown in more details with respect to FIG. 2 and FIG. 3. The first and the second axes of engagement (120, 220) are essentially perpendicular to each other. The variation of a toggle 1 shown in FIG. 1 further comprises a housing 500 that constitutes an outer shell 510 of the toggle 1 in order to transmit torque applied between the first and the second coupling means 110, 210. FIG. 2 shows the toggle 1 of FIG. 1, the housing being removed for illustrative purposes. As can be seen, in this variation of a toggle 1 a supporting core 400 made from rigid solid foam material is arranged between the first and the second coupling means 110, 210. The supporting core 400 helps to maintain a minimum distance between the first and the second coupling means 110, 210 and hence to maintain proper alignment of the first and the second coupling means 110, 210 even if the toggle 1 is not under tensile load. In addition, the support structure supports the closed-loop connecting means 300 in lateral direction and hence (in combination with the housing) prevents buckling of the portions of the closed-loop connecting means in case the toggle (accidentally) is compressed in longitudinal direction (z-axis), as will be explained in more detail with respect to FIG. 14.

Figure 3:
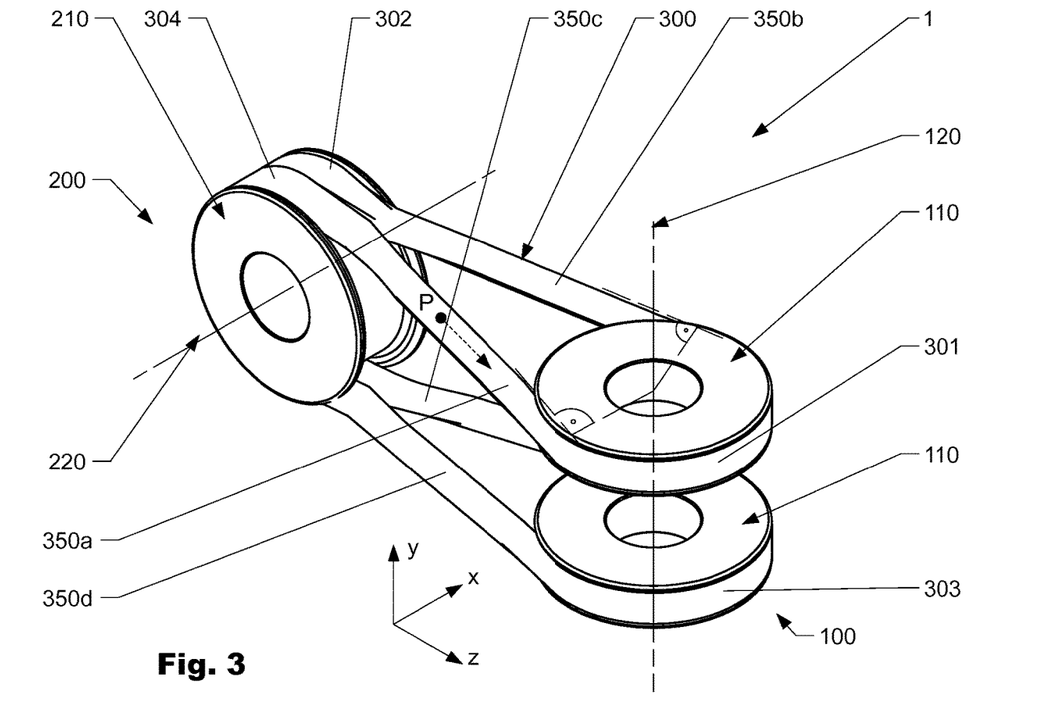
FIG. 3 schematically shows the toggle of FIG. 2, the supporting core being removed for illustrative purposes in a perspective view from above.

FIG. 3 shows the variation of a toggle 1 of FIG. 2 (respectively FIG. 1) with the support core 400 being removed in order to depict the closed-loop connecting means 300 more clearly. If viewed in longitudinal direction of the closed-loop connecting means 300 and starting from an imaginary starting point P arranged on a first strand 350a between the first and the second axes of engagement 120, 220 (schematically illustrated with the point and dotted arrow) the closed-loop connecting means first loops about the first coupling means 110 (respectively the first axis of engagement 120) forming a first loop 301. Subsequently a second strand 350b leads to the second coupling means 210 and loops about the second axis of engagement 220 forming a second loop 302. Subsequently a third strand 350d leads to the first coupling means 110 and subsequently loops the first axis of engagement 120 forming a third loop 303. Finally a fourth strand 350d leads to the second coupling means 210 and subsequently loops the second axis of engagement 220 forming a fourth loop 304 and subsequently goes back to the imaginary starting point P. Thus a closed loop is formed that is looped twice about the first axis of engagement 120 and twice looped about the second axis of engagement 220.

As also schematically shown in FIG. 3, the first coupling means 110 is configured such that the closed-loop connecting means 300 tangentially connects to the first coupling means 110, forming the first loop 301 and subsequently tangentially disconnects from the first coupling means 110 as also shown in subsequent FIG. 6.

According to such a variation of the invention a toggle 1 having a particularly high strength can be obtained as the parts of the closed-loop connecting means 300 which extend between the first and the second coupling means 110, 210 are to a large extent aligned with the typical main loading direction (z) of the toggle 1. Nevertheless, as clearly visible, a fully parallel alignment is not possible due to the restricted dimensions of the second coupling end 200 being an eye-type coupling end.

Figure 4:
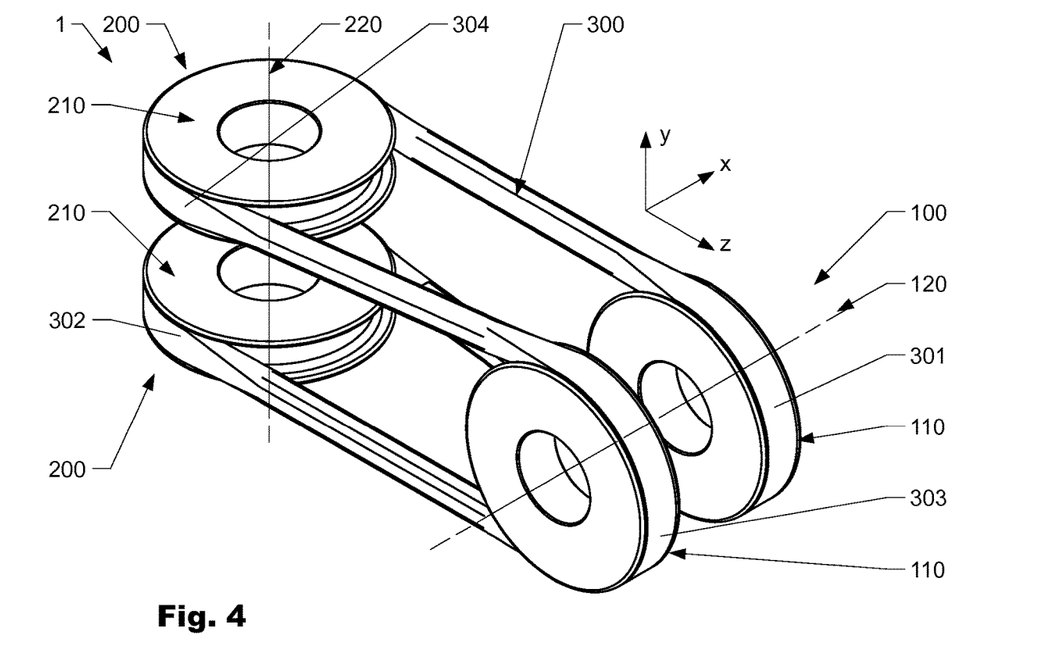
FIG. 4 schematically shows second variation of a toggle according to the invention in a perspective view from above.

A variation of a toggle 1 according to the present invention which has a particularly high strength is schematically shown in FIG. 4, having a first and a second coupling end 100, 200 both being jaw-type coupling ends. In this variation of a toggle 1 according to the present invention the parts of the closed-loop connecting means 300 which extend between the first and the second coupling means 110, 210 are (if compared to the variation shown in FIG. 3) to an even larger extent aligned in parallel with the typical main loading direction (z) of the toggle 1, increasing the strength of the toggle 1.

Figure 5:
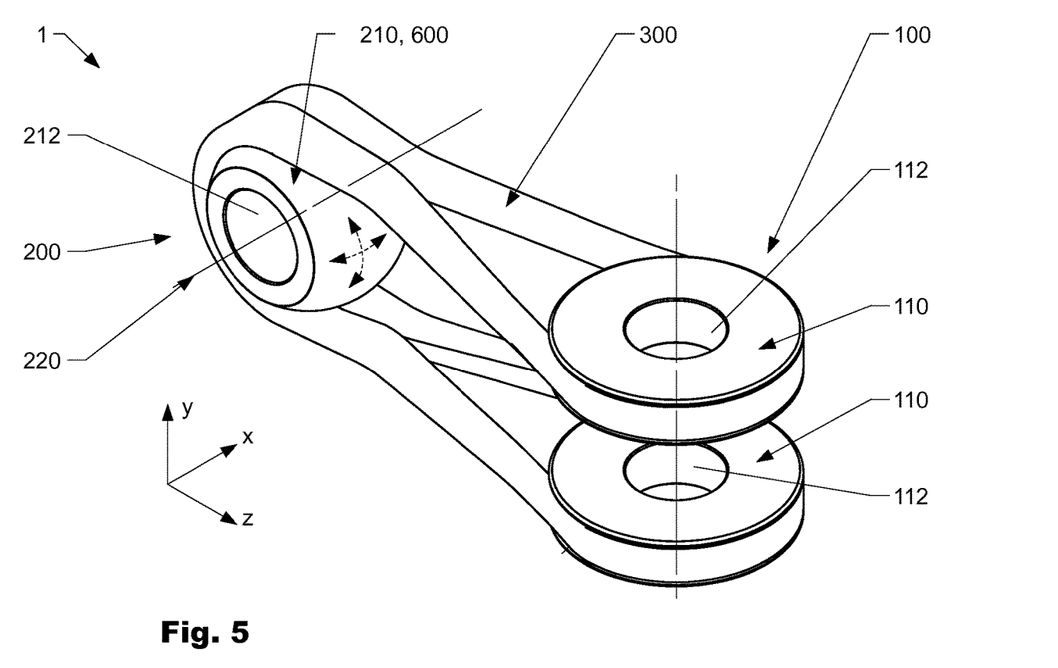
FIG. 5 schematically shows a third variation of a toggle according to the invention in a perspective view from above.

FIG. 5 schematically shows a variation of a toggle 1 according to the present invention where the second coupling means 210 comprises an alignment compensator means 600 configured to rotate the second axis of engagement 220 relatively to the closed-loop connecting means 300 (indicated by the dotted arrows). Thus, the second force application means 212, embodied as hole, can be rotated to a certain extent, allowing to compensate potential angular misalignment of a bolt (not shown) to be interconnected with the second coupling means 210. In the variation shown, the alignment compensator means 600 therefore comprises spherical body that is in direct physical contact with the closed-loop connecting means 300 in order to obtain direct load transfer.

Figure 6:
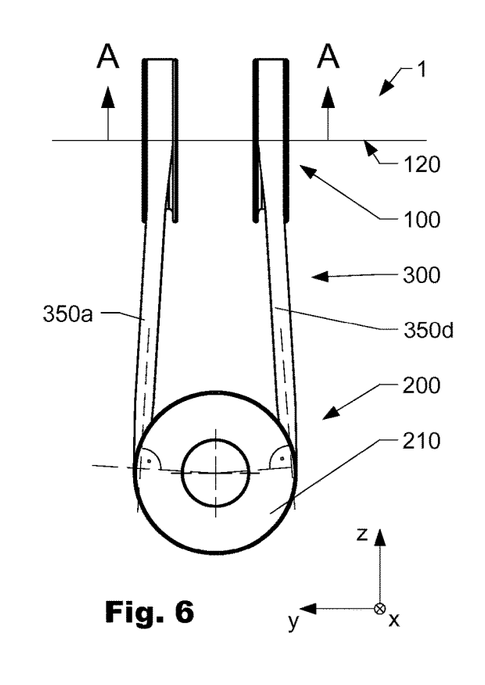
FIG. 6 schematically shows the variation of FIG. 3 in a view from the side.
Figure 7:
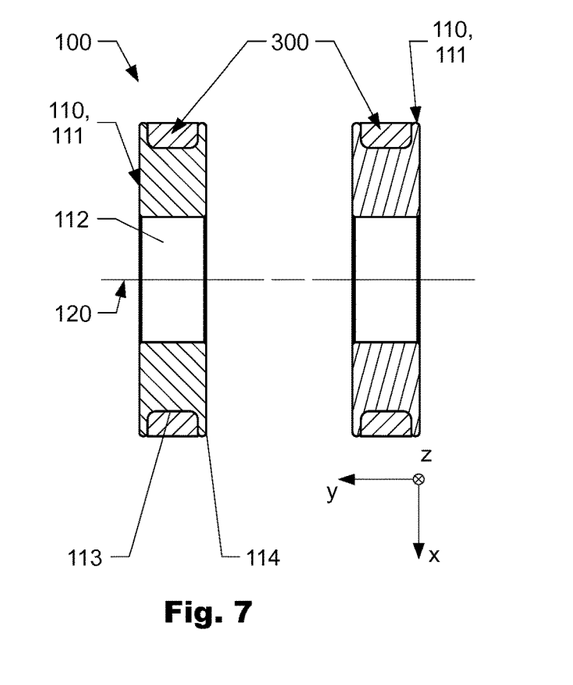
FIG. 7 schematically shows cross-section A-A of FIG. 6.
Figure 8:
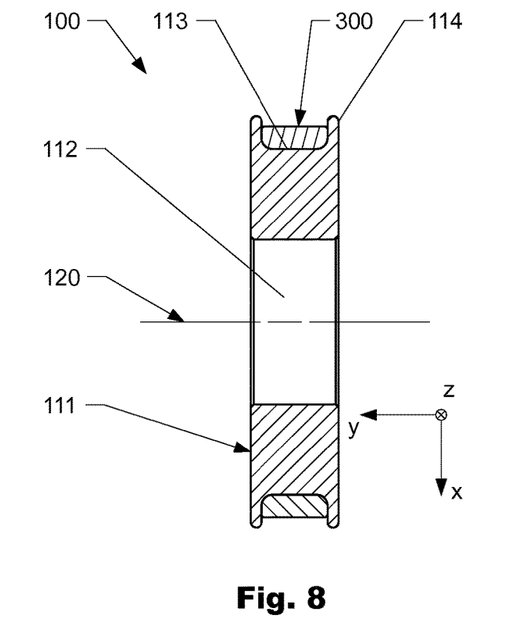
FIG. 8 schematically shows a cross-section analogous to FIG. 7 of a fourth variation of a toggle.

As depicted in FIG. 6 which shows the toggle of FIG. 3, the first and the fourth strand 350*a*, 350*d* extend such that they tangentially align to the second coupling means 210. FIG. 7 schematically shows cross-section A-A of FIG. 6, depicting the first coupling means 110 being embodied as a pair of bushings 111 which comprise a first force application means 112 being a hole extending along the first axis of engagement 120. The bushing 111 comprises a groove 113 that extends in peripheral direction around the bushing 111 and that is delimited by a skirt 114 configured such that part of the closed-loop connecting means 300 can be arranged within the groove 113. In the variation shown the closed-loop connecting means 300 is flush countersunk in the groove. Thus, proper alignment of the closed-loop connecting means 300 during loading of the toggle 1 can be maintained.

FIG. 8 to FIG. 11 schematically show cross-sections (analogous to FIG. 7) of four variations of a first or second coupling means 110, 210 of a toggle 1 according to the present invention. In the variation depicted in FIG. 8, a skirt 114 is arranged such that the closed-loop connecting means 300 is arranged in the groove 113 such that the skirt 114 protrudes from the closed-loop connecting means 300 at least at in certain regions of the groove 113. Such a variation of the invention may be advantageous in order to reduce the risk of the closed-loop connecting means 300 being mechanically damaged during installation of the toggle 1.

Figure 9:
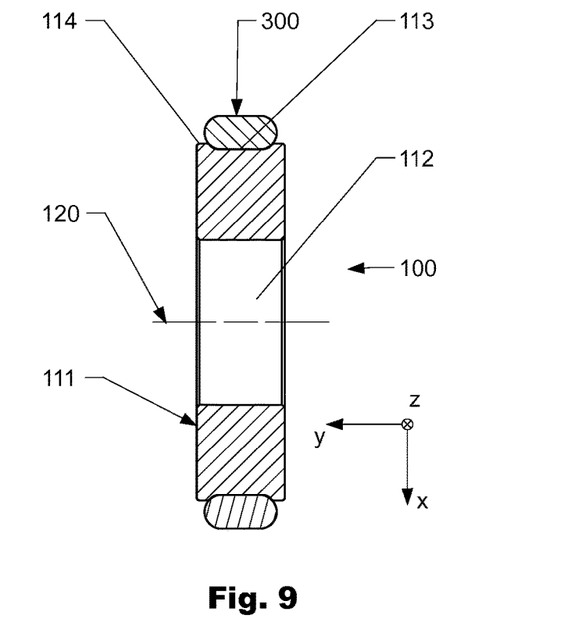
FIG. 9 schematically shows a cross-section analogous to FIG. 7 of a fifth variation of a toggle.

In the variation depicted in FIG. 9, the skirt 114 is arranged such that the closed-loop connecting means 300 is arranged in the groove 113 such that it protrudes from the groove 113. Such a variation of the invention may be advantageous in order to obtain a particularly lightweight toggle 1.

Figure 10:
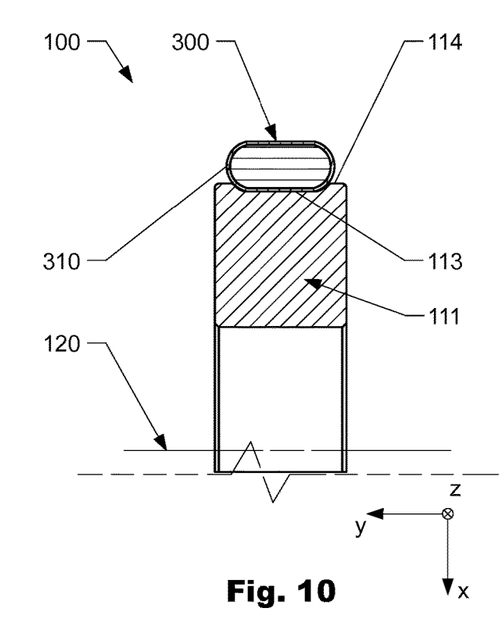
FIG. 10 schematically shows a cross-section analogous to FIG. 7 of a sixth variation of a toggle.

In the variation schematically shown in FIG. 10, in order to maintain alignment of the fibres of the closed-loop connecting means 300 attached to such a bushing 111 similar to the one shown in FIG. 9. The variation of a closed-loop connecting means 300 shown is surrounded by an enclosure 310, which is made from a roving of carbon fibres wrapped around the closed-loop connecting means 300.

Figure 11:
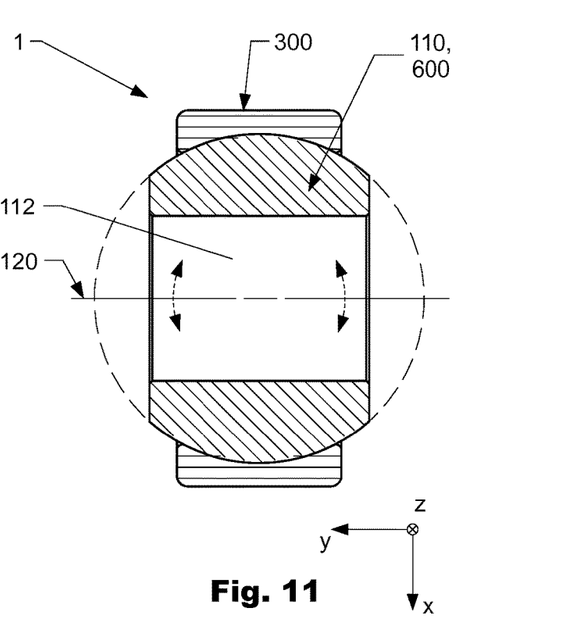
FIG. 11 schematically shows a cross-section analogous to FIG. 7 of a seventh variation of a toggle.

In the variation depicted in FIG. 11, the first coupling means 110 comprises an alignment compensator means 600 formed as a partially spherical body and configured to rotate the corresponding axis of engagement 120, 220 relatively to the closed-loop connecting means 300.

Figure 12:
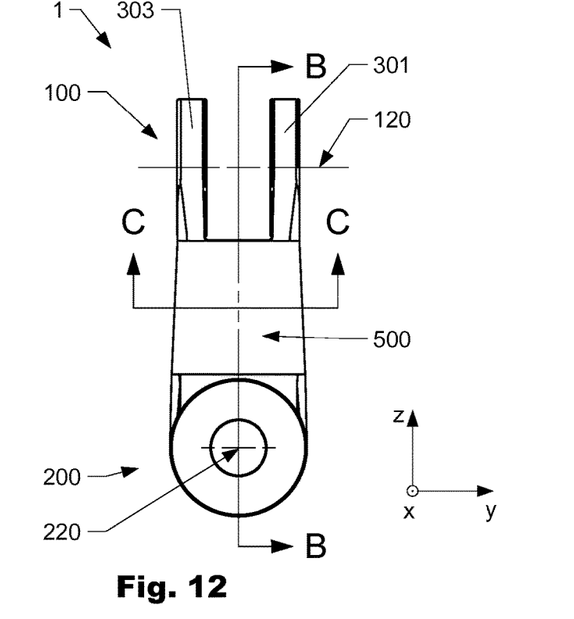
FIG. 12 schematically shows the toggle of FIG. 1 in a top view.
Figure 13:
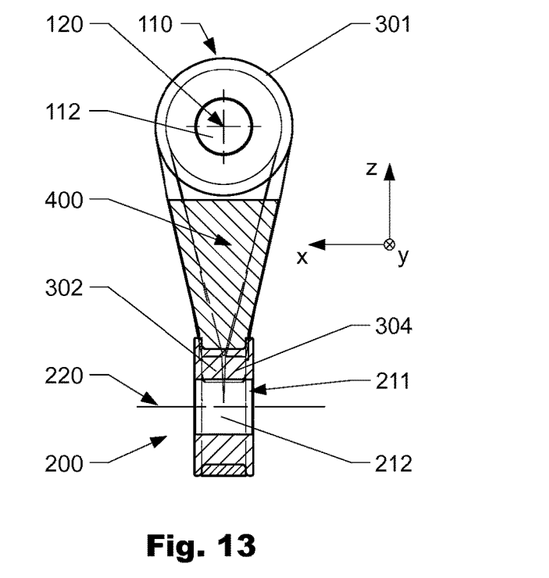
FIG. 13 schematically shows section B-B of FIG. 12.

FIG. 12 shows in a lateral view the variation of a toggle 1 as shown in FIG. 1 including the supporting core (not visible in FIG. 12) and the housing 500. As can be seen in cross-section B-B depicted in FIG. 13, the supporting core 400 made from a solid foam is arranged between the first and the second coupling means 110, 210 and thus ensures that a minimum distance between them is maintained. As well, as schematically shown, the second and fourth loop 302, 304 of the closed-loop connecting means 300 are merged and bonded by a matrix in order to form a combined fibre-reinforced plastic.

Figure 14:
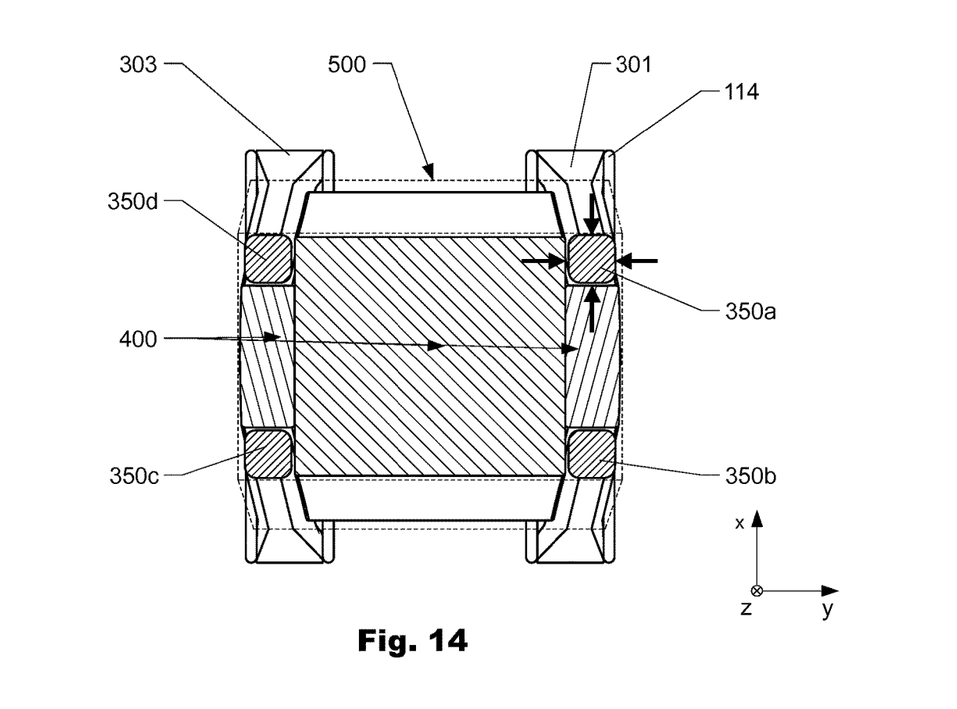
FIG. 14 schematically shows section C-C of FIG. 13.

As shown in section C-C as depicted in FIG. 14, a variation of a supporting core 400 may comprise multiple components which may facilitate production of the supporting core 400 as well as assembly of the toggle 1. As indicated by the bold arrows the supporting core 400 supports parts of the stands 350*a-d* of the closed-loop connecting means 300 laterally and hence restricts deflections of the closed-loop connecting means 300 in lateral direction (x/y-plane) which may cause buckling in case a compressive load is applied along the longitudinal axis of the toggle (z-direction). In addition, the housing 500 (schematically shown by dotted lines) provides a lateral support as well.

Figure 15:
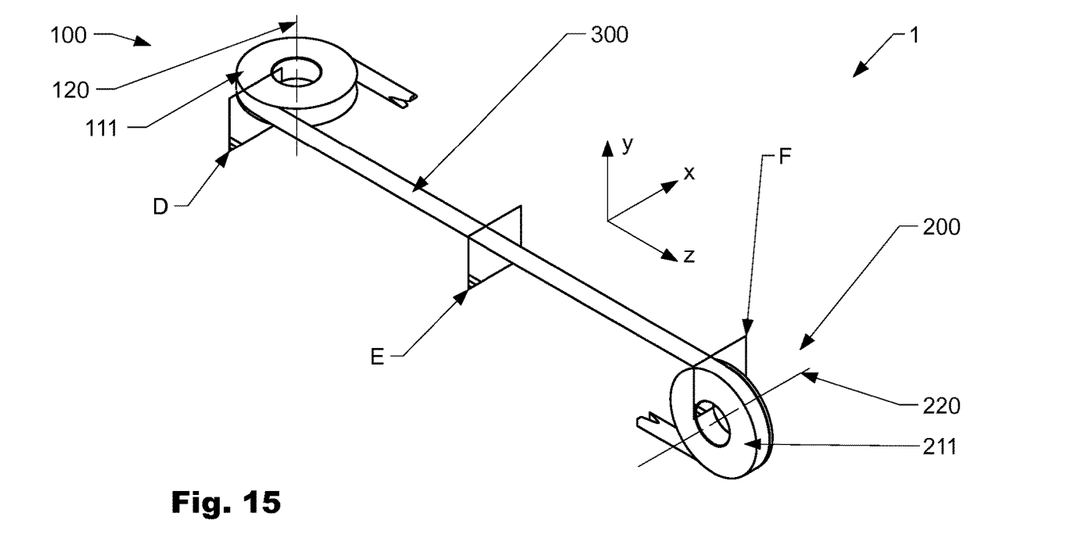
FIG. 15 schematically shows a portion of another variation of a toggle.
Figure 16A:
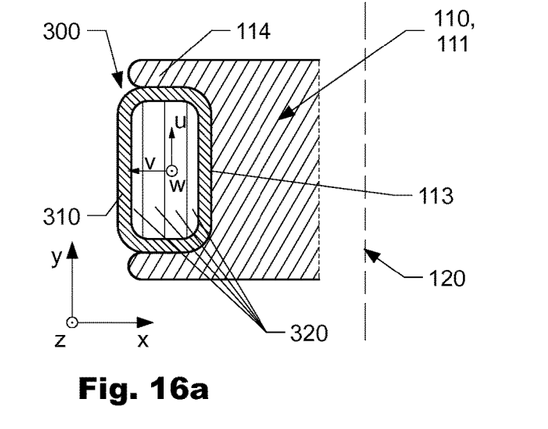
FIG. 16a shows section D of FIG. 15.
Figure 16B:
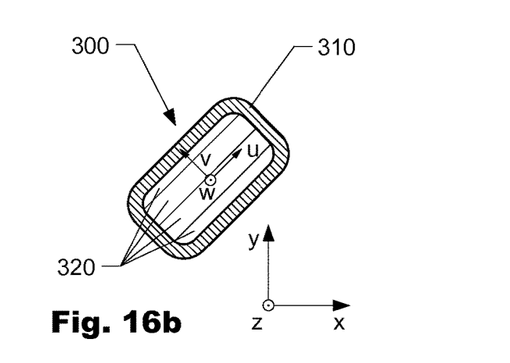
FIG. 16b shows section E of FIG. 15.
Figure 16C:
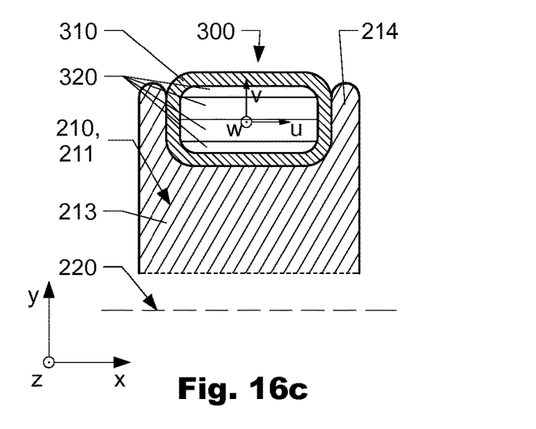
FIG. 16c shows section F of FIG. 15.

FIG. 15 to FIG. 16*c* schematically illustrate a possible microarchitecture of a variation of a closed-loop connection means 300 made from a fibre-reinforced plastic, showing a portion of a variation of a toggle 1 according to the invention. Most components of the toggle 1 as well as of the closed-loop connecting means 300 are clipped for illustrative purposes. As shown in FIG. 16*a*, the closed-loop connecting means 300 comprises a part that is made from a thin-walled elongated band 320 which was wound about the first coupling means 110 and subsequently about the second coupling means 210 multiple times in order to lay-up a laminated structure. The thin-walled elongated band 320 may be a layer of pre-impregnated carbon fibres that are arranged essentially unidirectionally in parallel to the longitudinal direction of the closed-loop connecting means 300. The subsequently laid loops of the thin-walled elongated band 320 are stacked in the v-direction (stacking direction v) of the local coordinate system of the ply, wherein the unidirectionally aligned fibres of the layers essentially extend in the w-direction which is essentially identical with the local longitudinal direction of the closed-loop connecting means 300. In the variation shown, all plies have the same orientation. However, according to a variation of the present invention, one or multiple plies may also have another orientation. In particular at least some fibres may be oriented within the u/w-plane such that they are not in parallel with the w-direction. Such plies may e.g. be used in order to prevent lateral extension (u-direction) of the closed-loop connecting means which may cause disintegration of fibre reinforced plastic. In the variation shown in FIG. 15 to FIG. 16*c* such reinforcements in lateral direction of the stack (u-direction) is obtained by an enclosure 310. Said enclosure 310 is also made from a fibre-reinforced plastic and comprises a roving of carbon fibres that was wrapped around the central stack of laminated thin-walled elongated band 320. Nevertheless, in certain variations of a toggle 1 where the closed-loop connecting means 300 is at least partially arranged in a groove 113 of a bushing 111 and hence supported laterally by a skirt 114, such an enclosure 310 or cross fibres may also be omitted. As also shown in FIG. 16a in combination with FIG. 15, layup of the stack of thin-walled elongated band 320 in the region of the first coupling means 110 is arranged such that the stacking direction v is perpendicular to the first axis of engagement 120. Thus a particularly good load transfer between the first coupling means 110 and the closed-loop connecting means 300 can be obtained and the mechanical competence of the toggle can significantly be increased. In the region between the first and the second connecting means 110, 210, the closed-loop connecting means 300 is twisted such that the stack of thin-walled elongated band 320 is progressively rotated about the w-direction (respectively the longitudinal direction (z-direction) of the toggle 1. Thus, as shown in FIG. 16b, the layup of the stack of thin-walled elongated band 320 in the region of the second coupling means 210 is again arranged such that the stacking direction v is perpendicular to the first axis of engagement 220. Thus, advantageous load transfer can also be obtained between the second coupling means 210 and the closed-loop connecting means 300. By applying such twisting of the closed-loop connecting means 300 in the region between the first and the second coupling end 100, 200 a toggle with a particularly high mechanical competence can be obtained.

Figure 16D:
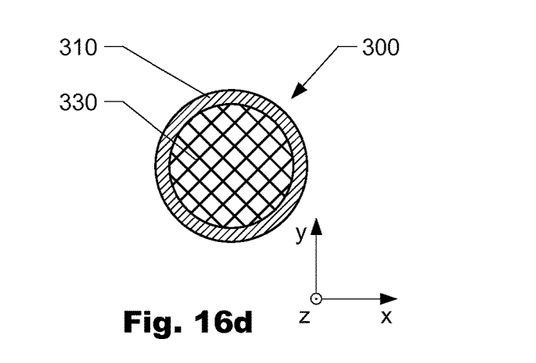
FIG. 16d shows a section E of another variation of a toggle.

Alternatively or in addition, as schematically shown in FIG. 16d, the closed-loop connecting means 300 may also comprise a non-layered core, e.g. a core made from at least one roving of carbon fibres. Such type of a closed-loop connecting means 300 may be advantageous for certain applications.

The invention claimed is:

1. A toggle (1) for rigging of a boat or a crane, comprising:
   a) a first coupling end (100)
      i. comprising a first coupling means (110) providing a first axis of engagement (120); and
   b) a second coupling end (200)
      i. comprising a second coupling means (210) providing a second axis of engagement (220);
   c) the first and the second coupling means (100, 200) arranged a distance apart from each other;
   d) a closed-loop connecting means (300)
      i. made from a fiber reinforced plastic,
      ii. comprising a plurality of fibrous layers (320) laying one above the other in a local stacking direction (v), and
      iii. wherein between the first and the second connecting means (110, 210) the closed-loop connecting means (300) is twisted such that the local stacking direction (v) rotates approximately 90° about a local longitudinal direction (w) of the closed-loop connecting means (300);
   e) the closed-loop connecting means (300) loops about the first axis of engagement (120) and
   f) the closed-loop connecting means (300) loops about the second axis of engagement (220),
   g) thereby mechanically interconnecting the first coupling means (110) with the second coupling means (210).

2. The toggle (1) according to claim 1, wherein the first and the second axes of engagement (120, 220) are essentially perpendicular to each other.

3. The toggle (1) according to claim 1, wherein the closed-loop connecting means (300) loops twice about the first axis of engagement (120) and is looped twice about the first axis of engagement (220).

4. The toggle (1) according to claim 3, wherein the closed-loop connecting means (300) if viewed in longitudinal direction (w) starting from an imaginary starting point (P) arranged between the first and the second axes of engagement (120, 220) first loops about the first axis of engagement (120) forming a first loop (301) subsequently loops about the second axis of engagement (220) forming a second loop (302) and subsequently loops the first axis of engagement (120) forming a third loop (303) and subsequently loops the second axis of engagement (220) forming a fourth loop (304) and subsequently goes back to the imaginary starting point (P).

5. The toggle (1) according to claim 4, wherein the second loop (302) and the fourth loop (304) are arranged adjacent to each other.

6. The toggle according to claim 1, wherein in a region of the closed-loop connecting means (300) that loops about the first axis of engagement (120) the plurality of fibrous layers is arranged such that the local stacking direction (v) is essentially perpendicular to the first axis of engagement (120) and/or in a region of the closed-loop connecting means (300) that loops about the second axis of engagement (220) the plurality of fibrous layers is arranged such that the local stacking direction (v) is essentially perpendicular to the second axis of engagement (220).

7. The toggle (1) according to claim 1, wherein the fibrous layers (320) are formed by at least one band which is multiply looped about itself.

8. The toggle (1) according to claim 3, wherein the closed-loop connecting means (300) forms four strands (350a-d) that extend between the first and the second coupling means (110, 210), each strand (350a-d) tangentially aligning to both the first and the second coupling means (110, 210) before looping about the first and the second axis of engagement (120, 220).

9. The toggle (1) according to claim 1, wherein the first and/or the second coupling means (110, 210) comprises a bushing (111, 211) arranged such that the closed-loop connecting means (300) loops about the bushing (111, 211).

10. The toggle (1) according to claim 9, wherein the bushing (111, 211) comprises a groove (223, 213) that extends at least partially in peripheral direction around the bushing (111, 211) and that is delimitated by a skirt (114, 214) configured such that at least part of the closed-loop connecting means (300) can be arranged within the groove (113, 213).

11. The toggle (1) according to claim 1, wherein at least part of the closed-loop connecting means (300) is surrounded by an enclosure (310).

12. The toggle (1) according to claim 11, wherein the closed-loop connecting means (300) is surrounded by an enclosure (310) in a region adjacent to the first and/or in a region adjacent to the second coupling means (110, 210).

13. The toggle (1) according to claim 1, wherein the first coupling means (110) and/or the second coupling means (210) comprises an alignment compensator means (600) configured to rotate the corresponding axis of engagement (120, 220) relatively to the closed-loop connecting means (300).

14. The toggle (1) according to claim 1, wherein a supporting core (400) is arranged between the first and the second coupling means (110, 210).

15. The toggle (1) according to claim 1, wherein the toggle (1) comprises a housing (500) constituting an outer shell (510) of the toggle (1).

16. The toggle (1) according to claim 15, wherein the housing (500) at least partially encompasses the closed-loop connecting means (300) in the region between the first and the second coupling end (100, 200).

17. The toggle (1) according to claim 15, wherein the housing (500) is configured to withstand torque applied between the first and the second coupling end (100, 200).

18. The toggle (1) according to claim 17, wherein the housing (500) is at least partially made from a fiber reinforced plastic.

19. A method for producing of a toggle (1) according to claim 1, comprising the method steps of:
   a) providing a first coupling means (110) having a first axis of engagement (120);
   b) providing a second coupling means (210) having a second axis of engagement (220);
   c) arranging the first and the second coupling means (110, 210) such that the first and the second axes of engagement (120, 220) are aligned a distance apart from and essentially perpendicular to each other;
   d) looping a thin-walled elongated band (320) comprising reinforcing-fibers about the first coupling means (110) and subsequently about the second coupling means (210);
   e) repeating method step d) to lay multiple layers of the thin-walled elongated band (320) such that a closed-loop connecting means (300) is formed, interconnecting the first and the second coupling means (110, 210).

20. The method according to claim 19, wherein the two ends of the thin-walled elongated band (320) are laid such that they rest directly against or under the latter.

* * * * *